(12) United States Patent
Mizobuchi

(10) Patent No.: US 11,176,327 B2
(45) Date of Patent: Nov. 16, 2021

(54) INFORMATION PROCESSING DEVICE, LEARNING METHOD, AND STORAGE MEDIUM

(71) Applicant: FUJITSU LIMITED, Kawasaki (JP)

(72) Inventor: Yuji Mizobuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 178 days.

(21) Appl. No.: 16/373,564

(22) Filed: Apr. 2, 2019

(65) Prior Publication Data
US 2019/0228072 A1 Jul. 25, 2019

Related U.S. Application Data

(63) Continuation of application No. PCT/JP2016/079545, filed on Oct. 4, 2016.

(51) Int. Cl.
*G06F 40/58* (2020.01)
*G06F 40/30* (2020.01)
(Continued)

(52) U.S. Cl.
CPC .............. *G06F 40/30* (2020.01); *G06F 16/00* (2019.01); *G06F 40/216* (2020.01);
(Continued)

(58) Field of Classification Search
CPC .......... G06F 40/58; G06F 40/44; G06F 40/45; G06F 40/47; G06N 20/00
See application file for complete search history.

(56) References Cited

U.S. PATENT DOCUMENTS 7,069,265 B2 * 6/2006 Kim .................... G06F 16/3334
8,645,119 B2 * 2/2014 Och ........................ G06F 40/49
704/2
(Continued)

FOREIGN PATENT DOCUMENTS

JP 2004-355224 12/2004
JP 2008-65468 3/2008
(Continued)

OTHER PUBLICATIONS

Mikolov et al., Mikolov, Exploiting Similarities among Languages for Machine Translation, 2013, arXiv preprint arXiv: 1309.4168, pp. 1-10, (Year: 2013).*
(Continued)

*Primary Examiner* — Lamont M Spooner
(74) *Attorney, Agent, or Firm* — Fijitsu Patent Center

(57) ABSTRACT

A non-transitory computer-readable storage medium storing a program that causes a computer to execute a process, the process includes learning distributed representations of words included in a word space of a first language using a learner for learning the distributed representations; classifying words included in a word space of a second language different from the first language into words common to words included in the word space of the first language and words not common to words included in the word space of the first language; and replacing distributed representations of the common words included in the word space of the second language with distributed representations of the words, corresponding to the common words, in the first language and adjusting a parameter of the learner.

10 Claims, 11 Drawing Sheets

(51) Int. Cl.
*G06F 16/00* (2019.01)
*G06F 40/45* (2020.01)
*G06F 40/216* (2020.01)
*G06F 40/284* (2020.01)
*G06N 20/00* (2019.01)

(52) U.S. Cl.
CPC ............ *G06F 40/284* (2020.01); *G06F 40/45* (2020.01); *G06N 20/00* (2019.01)

(56) References Cited

U.S. PATENT DOCUMENTS

| | | | |
|---|---|---|---|
| 9,779,085 B2* | 10/2017 | Wick | G06F 40/242 |
| 10,083,167 B2* | 9/2018 | Sridhar | G06F 40/232 |
| 10,091,140 B2* | 10/2018 | Galley | G06F 40/56 |
| 10,936,828 B2* | 3/2021 | Le | G06F 40/56 |
| 2005/0010390 A1 | 1/2005 | Shimohata | |
| 2007/0112714 A1* | 5/2007 | Fairweather | G06K 13/0825 706/46 |
| 2008/0319746 A1 | 12/2008 | Okamoto et al. | |
| 2011/0077933 A1* | 3/2011 | Miyamoto | G10L 15/26 704/2 |
| 2015/0134321 A1* | 5/2015 | Fennell | G06F 40/40 704/2 |
| 2016/0098386 A1* | 4/2016 | Rangarajan Sridhar | G06F 40/58 704/9 |
| 2016/0350288 A1* | 12/2016 | Wick | G06F 40/242 |
| 2017/0031899 A1* | 2/2017 | Lee | G06F 40/242 |
| 2017/0068665 A1* | 3/2017 | Tamura | G06F 40/44 |
| 2018/0011843 A1* | 1/2018 | Lee | G06F 40/51 |
| 2018/0046618 A1* | 2/2018 | Lee | G06F 40/53 |
| 2018/0052828 A1* | 2/2018 | Na | G06F 40/58 |
| 2019/0026371 A1* | 1/2019 | Wenzek | G06F 16/3337 |
| 2020/0034435 A1* | 1/2020 | Norouzi | G06F 40/44 |

FOREIGN PATENT DOCUMENTS

| | | |
|---|---|---|
| JP | 2008-547038 | 12/2008 |
| JP | 2009-3888 | 1/2009 |
| WO | 2007/007201 | 1/2007 |

OTHER PUBLICATIONS

Tomas Mikolov et al., "Efficient Estimation of Word Representations in Vector Space", In Proceedings of Workshop at ICLR, pp. 1-11, Sep. 2013 (12 pages).

Pranava Swaroop Madhyashtha et al., "Mapping Unseen Words to Task-Tranined Embedding Spaces", pp. 100-110 (11 pages).

International Search Report attached with the Written Opinion of the International Searching Authority, mailed in connection with PCT/JP2016/079545 and dated Nov. 8, 2016, with partial English translation (10 pages).

Hiroaki Hayashi et al., "Language traversal information retrieval using context information by distributed expression of languages", The 7th Forum on Data Engineering and Information Management, pp. 1-6, Mar. 4, 2015 (10 pages). Cited in ISR.

Hiroaki Takatsu et al., "Recognition of implication relations of verbs and phrases using distributed representation", Proceedings of the 21st Annual Conference of the Society of Language Processing, pp. 928-931, Mar. 9, 2015 (7 pages). Cited in ISR.

* cited by examiner

INFORMATION PROCESSING DEVICE, LEARNING METHOD, AND STORAGE MEDIUM

CROSS-REFERENCE TO RELATED APPLICATION

This application is a continuation application of International Application PCT/JP2016/079545 filed on Oct. 4, 2016 and designated the U.S., the entire contents of which are incorporated herein by reference.

FIELD

The embodiment discussed herein is related to an information processing device, a learning method, and a storage medium.

BACKGROUND

It is important to produce highly accurate representations of words in text processing, and a number of studies have been conducted. In recent years, as a technique for producing representations of words, Word2Vec is known (refer to, for example, Tomas Mikolov, Kai Chen, Greg Corrado, and Jeffrey Dean. Efficient Estimation of Word Representations in Vector Space. In Proceedings of Workshop at ICLR, 2013).

Word2Vec is a system for producing distributed representations of words based on the idea (distribution hypothesis) that similar words appear in similar sentences. The distributed representations of the words are expressed by vectors indicating semantic relationships between the words. Word2Vec uses a supervised learning method for a neural network composed of an input layer, a hidden layer, and an output layer to learn relationships between a given word appearing in a sentence and words in the vicinity of the given word and a distributed representation of the given word. For Word2Vec, the Continuous Bag-of-Words model and the Skip-gram model have been proposed. The Skip-gram model inputs a vector corresponding to a given word and predicts a word in the vicinity of the given word.

FIG. 8 is a diagram illustrating the Skip-gram model of Word2Vec. As illustrated in FIG. 8, a neural network composed of an input layer, a hidden layer, and an output layer is built for the Skip-gram model.

A Vth dimensional input vector x corresponding to a given word appearing in a sentence is input to the input layer. The input vector x is a V-th dimensional one-hot vector. V indicates the number of words appearing in the sentence. The one-hot vector indicates that an element corresponding to the given word is 1 and that other elements are 0.

An N-th dimensional word vector of the given word is generated in the hidden layer. $W_{V \times N}$ is a weight between the input layer and the hidden layer and is expressed by a matrix of V×N. In the output layer, V-th dimensional output vectors $y_{1j}$ to $y_{cj}$ are generated for a number C of panels. C is the number of panels, and $y_{1j}$ to $y_{cj}$ are the output vectors corresponding to words preceding and succeeding the given word. $W'_{N \times V}$ is a weight between the hidden layer and the output layer and is expressed by a matrix of N×V.

The Skip-gram model inputs, to the input layer, a V-th dimensional one-hot vector $x_v$ as an input vector to be input. After mapping the input one-hot vector $x_v$ to the N-th dimensional hidden layer, the Skip-gram model outputs, to the output layer, V-th output vectors corresponding to a number C of words.

When the number C of output vectors are different from predefined predicted vectors, the Skip-gram model updates the weights serving as parameters in the order of the weight $W'_{N \times V}$ between the hidden layer and the output layer and the weight $W_{V \times N}$ between the input layer and the hidden layer in order to learn differences between the vectors. The parameters are updated by, for example, back propagation.

A word vector h, obtained by repeatedly executing learning, of the hidden layer is a distributed representation of the given word (input vector x).

A technique for learning distributed representations of words in two different tasks and using the learned distributed representations of the words to learn vector mapping between the tasks is known (refer to, for example, Madhyastha, Pranava Swaroop, et al. "Mapping Unseen Words to Task-Trained Embedding Spaces"). In this technique, to produce a distributed representation of an unknown word in a certain task, a distributed representation learned in another task is mapped via an objective function.

FIG. 9 is a diagram illustrating an example of vector mapping to be executed between tasks using distributed representations of words. As illustrated in FIG. 9, when a word space of a mapping source as a task and a word space of a mapping destination as a task exist, a mapping function is learned from distributed representations of a pair of words between the different tasks. When the word that forms the pair with the word of the mapping source does not exist in the mapping destination, or when the word of the mapping destination is unknown, a distributed representation of the unknown word of the mapping destination is produced from the distributed representation of the word of the mapping source and the mapping function.

As other examples of related art, Japanese National Publication of Patent Application No. 2008-547038, Japanese Laid-open Patent Publication No. 2009-3888, Japanese Laid-open Patent Publication No. 2008-65468, and the like have been disclosed.

In the related-art technique, however, a distributed representation of a word that exists in the mapping source but does not exist in the mapping destination is learned, but a distributed representation of a word, which exists in the mapping destination but does not exist in the mapping source, is not learned. In the learning of a distributed representation of a word, the case where the amount of language resources is sufficient is assumed, and the case where the amount of language resources is not sufficient is not assumed. Thus, when the amount of language resources included in the word space of the mapping destination is not sufficient, a distributed representation of a word of the mapping destination is not learned. It is, therefore, desirable that a distributed representation be learned with high accuracy even when the amount of language resources included in the word space is not sufficient.

SUMMARY

According to an aspect of the embodiments, a non-transitory computer-readable storage medium storing a program that causes a computer to execute a process, the process includes learning distributed representations of words included in a word space of a first language using a learner for learning the distributed representations; classifying words included in a word space of a second language different from the first language into words common to words included in the word space of the first language and words not common to words included in the word space of the first language; and replacing distributed representations of the common words included in the word space of the second language with distributed representations of the words, corresponding to the common words, in the first language and adjusting a parameter of the learner The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, an embodiment of a learning program disclosed herein, an information processing device disclosed herein, a learning method disclosed herein is described in detail with reference to accompanying drawings. The present disclosure is not limited by the embodiment.

Embodiment

[Configuration of Information Processing Device According to Embodiment]

Figure 1:
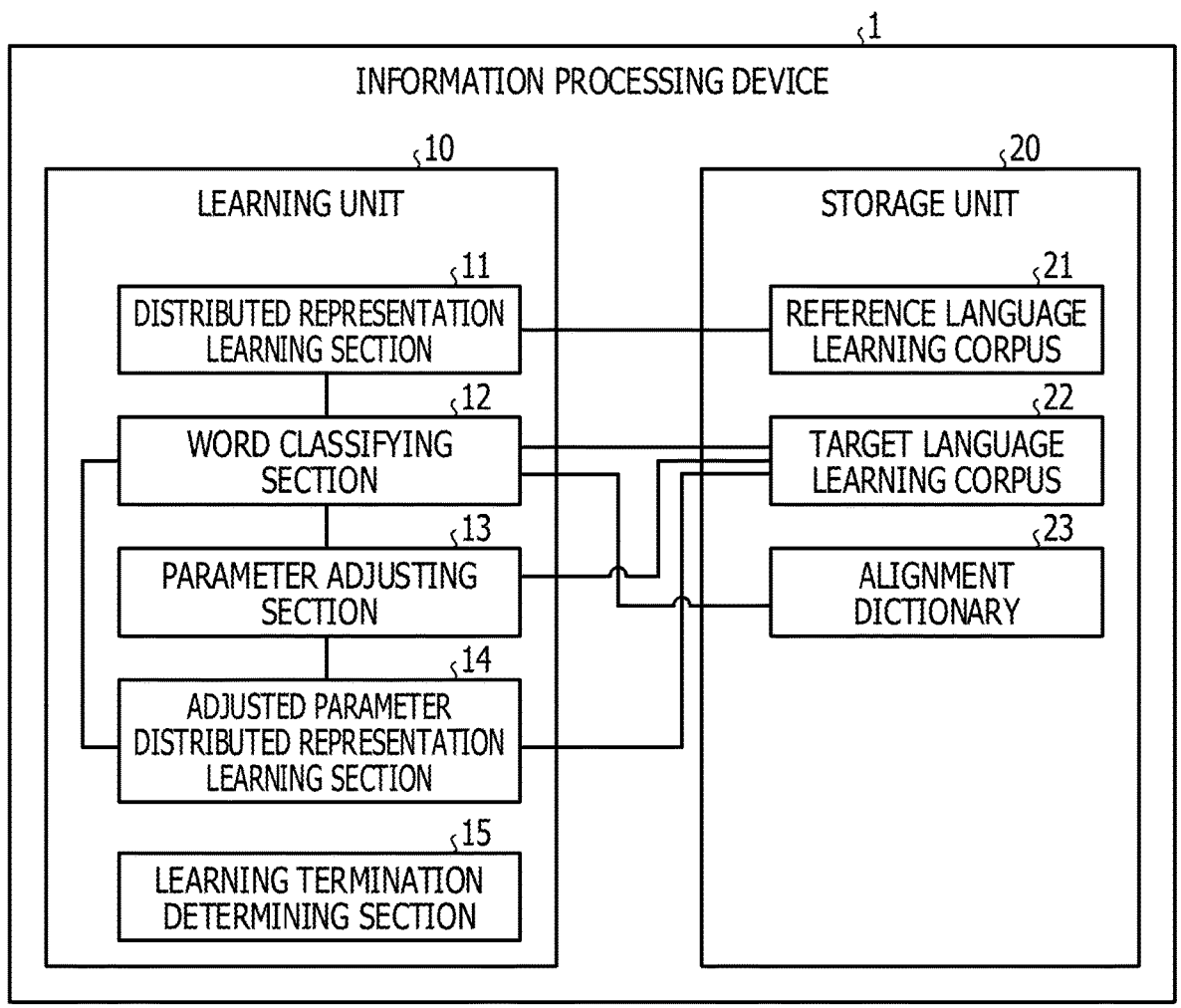
FIG. 1 is a functional block diagram illustrating a configuration of an information processing device according to an embodiment.

FIG. 1 is a functional block diagram illustrating a configuration of an information processing device according to the embodiment. The information processing device 1 illustrated in FIG. 1 treats, as a reference language, a language with language resources of an amount larger than a defined amount and uses a distributed representation of a word in the reference language to learn a distributed representation of a word in a language with language resources of an amount smaller than the defined amount. A distributed representation of a word in a certain language is expressed by a vector indicating a semantic relationship between the word and another word in another language. In the following description, a language with language resources of an amount larger than the defined amount is described as a reference language, and a language with language resources of an amount smaller than the defined amount is described as a target language.

Figure 2:
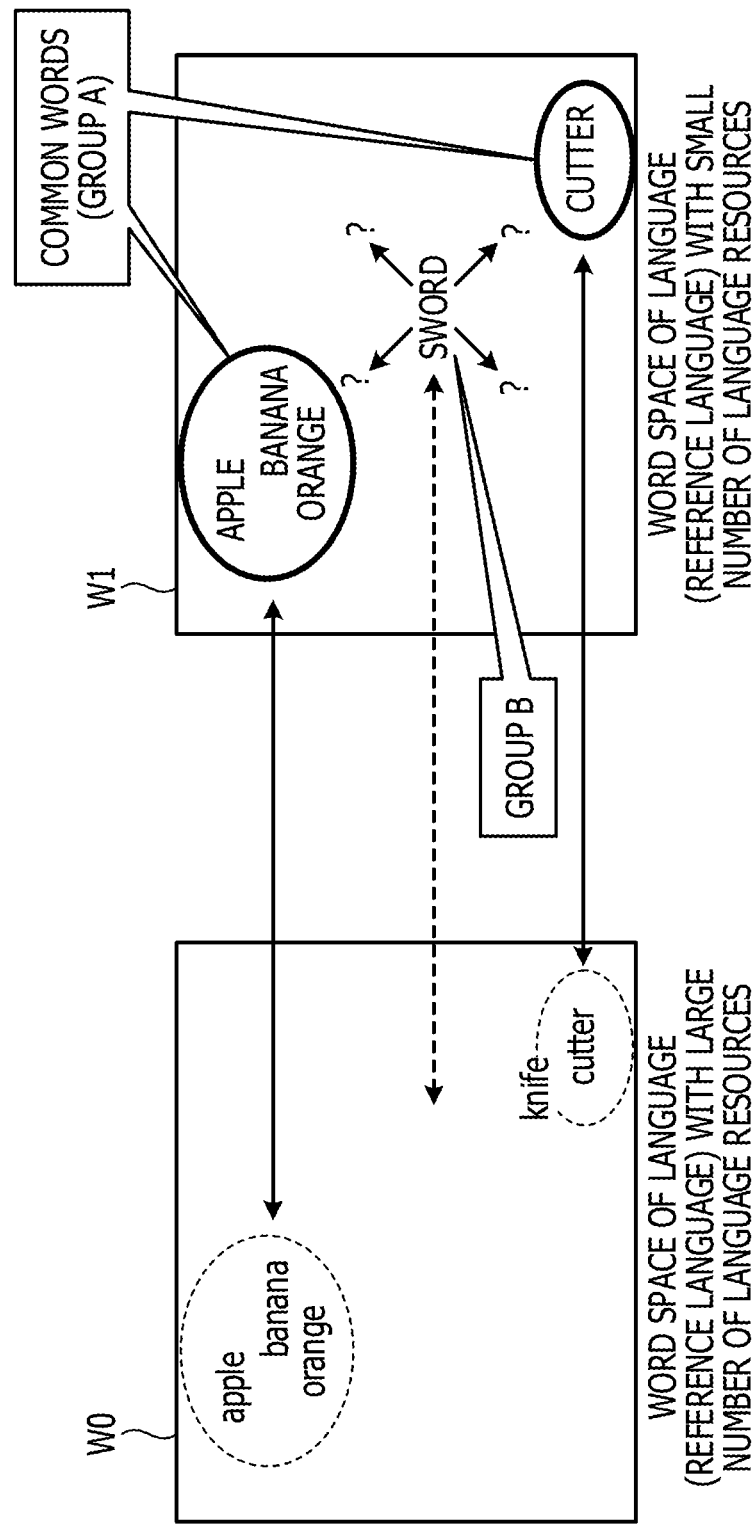
FIG. 2 is a diagram describing an overview of the learning of distributed representations of words according to the embodiment.

An overview of the learning, to be executed by the information processing device 1, of distributed representations of words is described with reference to FIG. 2. FIG. 2 is a diagram describing the overview of the learning of the distributed representations of the words according to the embodiment. As illustrated in FIG. 2, a word space W0 of the reference language and a word space W1 of the target language exist. The word space W0 of the reference language includes a large number of language resources and is, for example, a word space of English. The word space W1 of the target language includes a small number of language resources and is, for example, a word space of Japanese.

The information processing device 1 uses a technique for producing a distributed representation of a word to produce a distributed representation of a word included in the word space W0 of the reference language. The technique for producing a distributed representation of a word may be a single algorithm of a program for learning a distributed representation of a word and is, for example, the Skip-gram model of Word2Vec.

The information processing device 1 classifies words included in the word space W1 of the target language into a group (group A) of words common to words included in the word space W0 of the reference language and a group (group B) of words not common to words included in the word space W0 of the reference language. In this example, target language words included in the word space W1 of the target language and corresponding to words "apple", "banana", "orange", and "cutter" are common to the words "apple", "banana", "orange", and "cutter" included in the word space W0 of the reference language and are classified into the group A. A target language word included in the word space W1 of the target language and corresponding to a word "sword" is not common to any of words included in the word space W0 of the reference language and is classified into the group B.

Then, the information processing device 1 uses, for the group A, distributed representations of the words, common to the words classified in the group A, in the reference language for distributed representations of the words, classified in the group A, in the target language and adjusts a predetermined parameter of a single algorithm of a program, including Word2Vec, for learning a distributed representation of a word. For example, a distributed representation of the target language word corresponding to "apple" and included in the group A is used as a distributed representation of "apple". A distributed representation of the target language word corresponding to "banana" and included in the group A is used as a distributed representation of "banana".

Then, the information processing device 1 inputs, for the group B, the adjusted predetermined parameter to the single algorithm of the program, including Word2Vec, for learning a distributed representation of a word and learns a distributed representation of the word, included in the group B, in the target language. For example, the information processing device 1 learns a relative distributed representation of the uncommon word in the target language by crosschecking the uncommon word in the target language to the positions of the words included in the group A. For example, the distributed representation of the uncommon target language word included in the group B and corresponding to the word "sword" is relatively learned by crosschecking the uncommon target language word to the positions of the words included in the group A.

Thus, even when the amount of the language resources included in the word space of the target language is not sufficient, the information processing device 1 may learn distributed representations with high accuracy. In the learning of a distributed representation of a word, the case where the amount of language resources is not sufficient may not be assumed, and when the amount of language resources is not sufficient, distributed representations of words, which are language resources, may not be learned. However, even when the amount of language resources is not sufficient, the information processing device 1 may learn distributed representations with high accuracy.

Returning to FIG. 1, the information processing device 1 includes a learning unit 10 and a storage unit 20. The learning unit 10 corresponds to an electronic circuit such as a central processing unit (CPU). The learning unit 10 includes an internal memory for storing control data and a program defining procedures for various processes. The program causes the learning unit 10 to execute the various processes. The learning unit 10 includes a distributed representation learning section 11, a word classifying section 12, a parameter adjusting section 13, an adjusted parameter distributed representation learning section 14, and a learning termination determining section 15.

The storage unit 20 is a storage device that is a semiconductor memory element such as a flash memory, a hard disk, an optical disc, or the like. The storage unit 20 includes a reference language learning corpus 21, a target language learning corpus 22, and an alignment dictionary 23.

The reference language learning corpus 21 is used to learn the reference language and is written in the reference language. The target language learning corpus 22 is used to learn the target language and is written in the target language. Each of the corpuses is a set of texts.

The alignment dictionary 23 includes correspondence relationships between words for representations in the reference language and representations in the target language. For example, when the reference language is English and the target language is Japanese, the alignment dictionary 23 includes correspondence relationships between words for representations in English and representations in Japanese. An example of the alignment dictionary 23 is Weblio that is an online English dictionary service in Japan.

The distributed representation learning section 11 uses a technique for producing a distributed representation of a word to learn a distributed representation of a word included in a word space of the reference language. For example, the distributed representation learning section 11 receives the reference language learning corpus 21 and uses, for example, the Skip-gram model of Word2Vec to learn distributed representations of words included in the reference language learning corpus 21. The learning using the Skip-gram model of Word2Vec is executed using an existing technique. The learning may be executed using a technique disclosed in "Tomas Mikolov, Kai Chen, Greg Corrado, and Jeffrey Dean. Efficient Estimation of Word Representations in Vector Space. In Proceedings of Workshop at ICLR, 2013". Alternatively, the learning may be executed using a technique disclosed in "Xin Rong. word2vec Parameter Learning Explained".

Figure 3A:
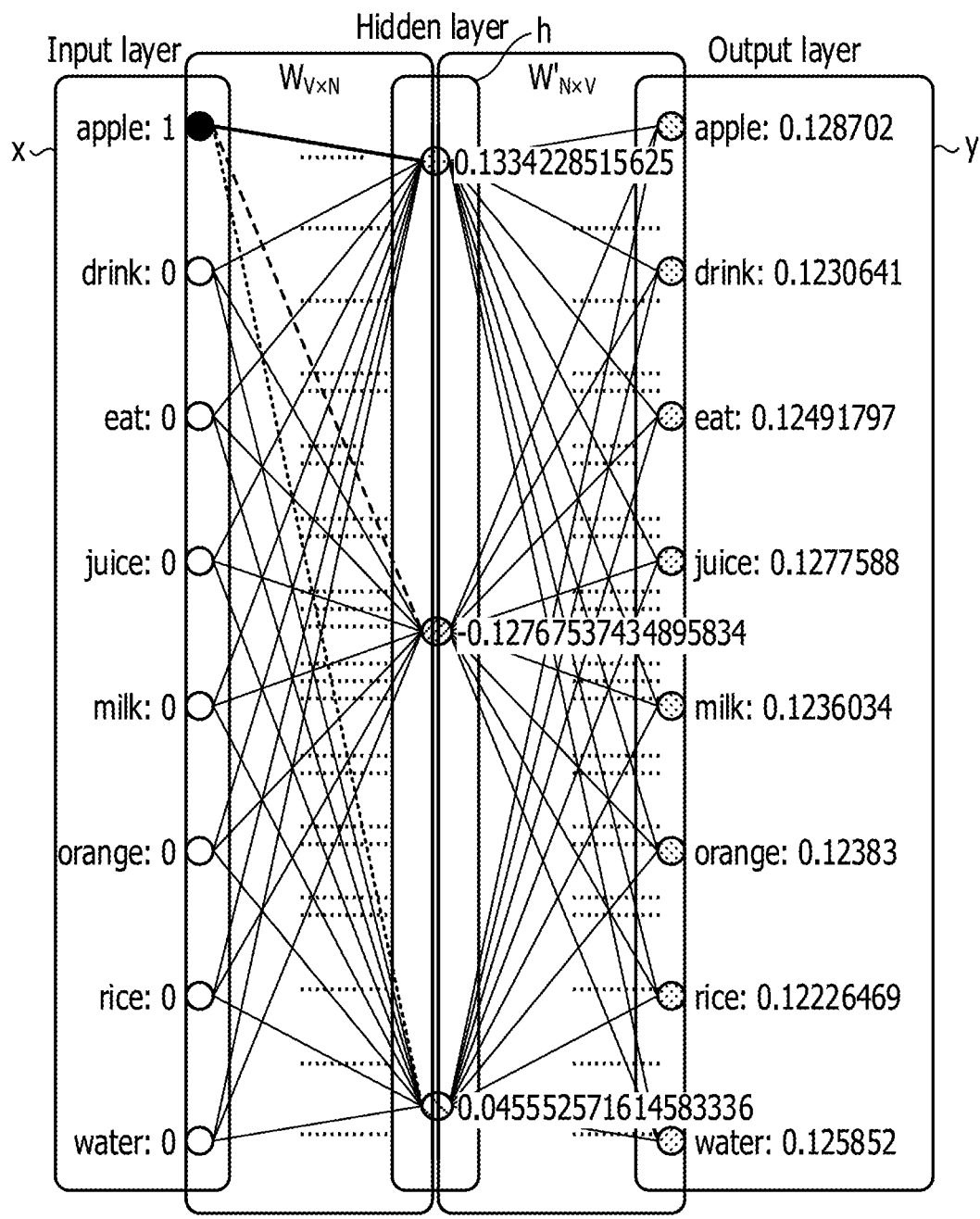
FIG. 3A is a first diagram illustrating an example of a process of learning a distributed representation according to the embodiment.
Figure 3B:
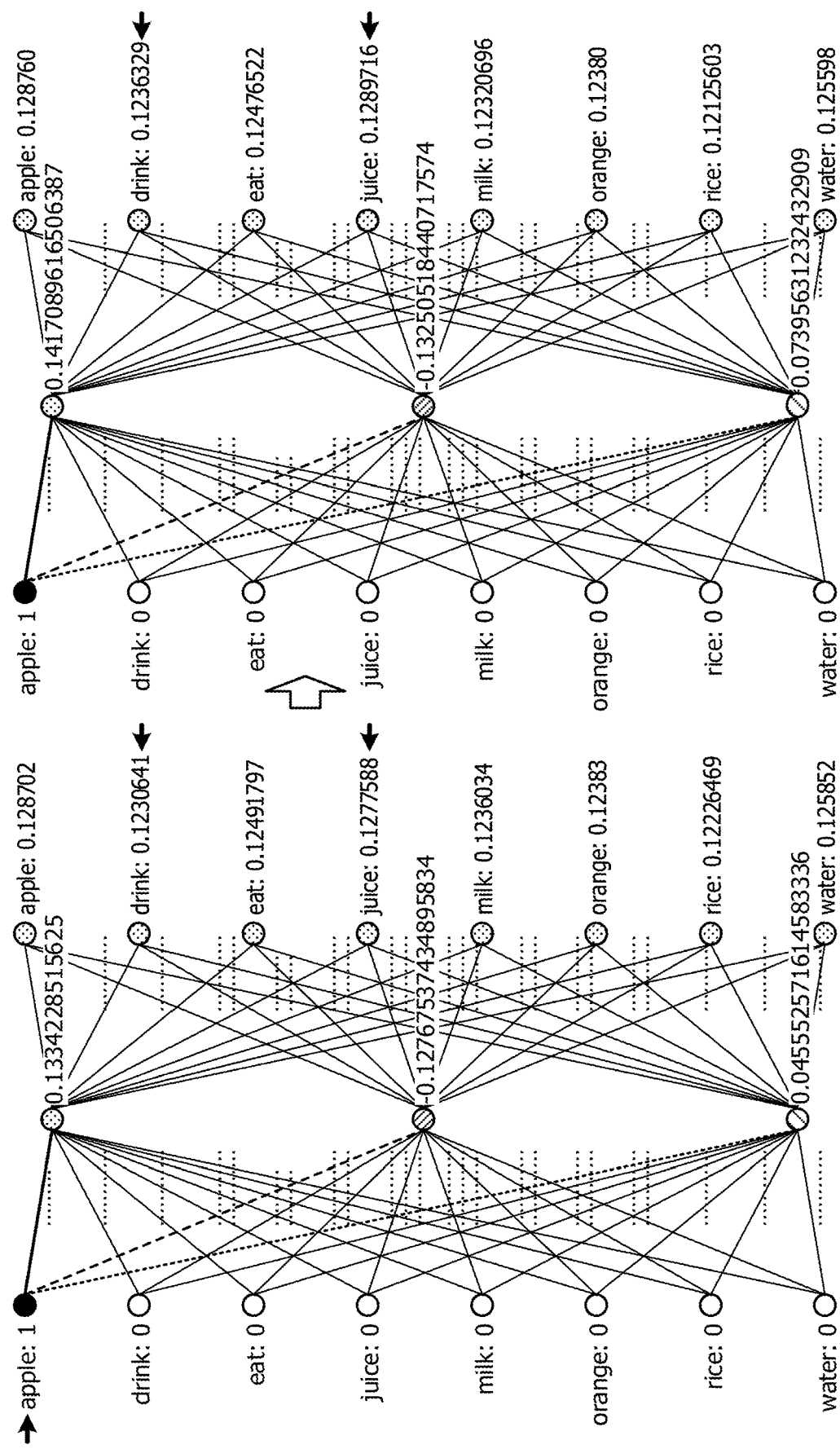
FIG. 3B is a second diagram illustrating the example of the process of learning a distributed representation according to the embodiment.
Figure 3C:
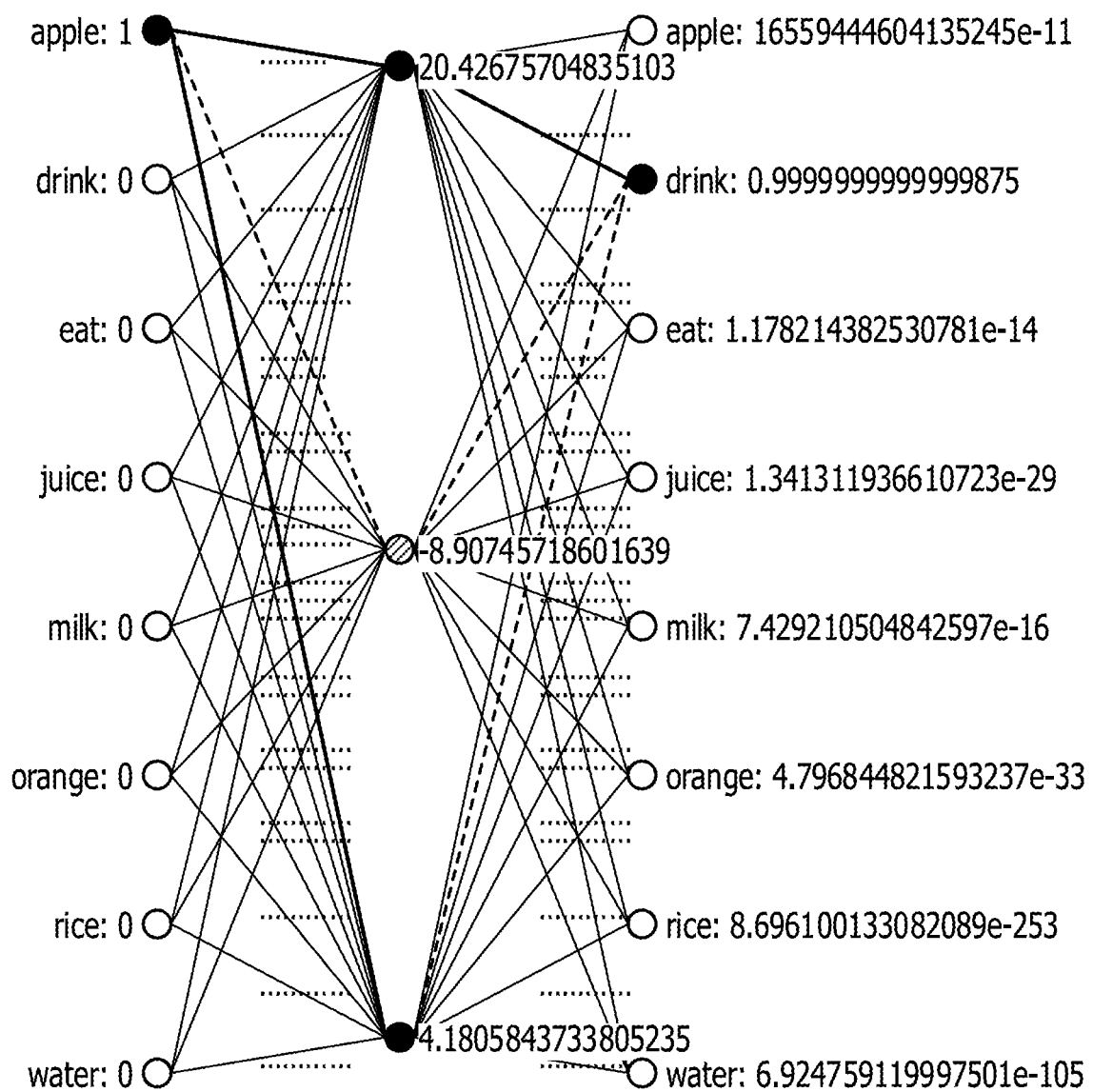
FIG. 3C is a third diagram illustrating the example of the process of learning a distributed representation according to the embodiment.

A process of learning a distributed representation by the distributed representation learning section 11 is described with reference to FIGS. 3A to 3C. FIGS. 3A to 3C are diagrams illustrating an example of the process of learning a distributed representation according to the embodiment. In FIGS. 3A to 3C, a technique for producing a distributed representation of a word is described as the Skip-gram model of Word2Vec. The example assumes that the reference language is English and that the target language is Japanese. The example also assumes that the reference language learning corpus 21 indicates that "I drink apple juice • • • ".

The distributed representation learning section 11 builds a neural network composed of an input layer, a hidden layer, and an output layer for the Skip-gram model.

First, the input layer, the hidden layer, and the output layer are described below. A V-th dimensional input vector x corresponding to a given word is input to the input layer. The input vector x is a one-hot vector. V indicates the number of words included in the reference language learning corpus 21. The one-hot vector indicates that an element corresponding to the given word is 1 and that other elements are 0.

In the hidden layer, an N-th dimensional word vector h indicating a distributed representation of the given word "apple" is finally generated. W a weight between the input layer and the hidden layer and is expressed by a matrix of V×N. As initial states of elements of $W_{V \times N}$ is random values are given, for example.

In the output layer, V-th dimensional output vectors $y_c$ are generated for a number C of panels that are not illustrated. C is the number of predetermined panels, and $y_c$ indicates the output vectors corresponding to words preceding and succeeding the given word. $W'_{N \times V}$ is a weight between the hidden layer and the output layer and is expressed by a matrix of N×V. As initial states of elements of $W_{N \times V}$, random values are given, for example.

As illustrated in FIG. 3A, the distributed representation learning section 11 uses the Skip-gram model in the neural network composed of the input layer, the hidden layer, and the output layer to learn a distributed representation of the given word. For example, it is assumed that the input vector x is a one-hot vector indicating that an element corresponding to the given word "apple" included in the reference language learning corpus 21 is 1 and that other elements are 0. When the distributed representation learning section 11 receives the input vector x corresponding to the given word "apple", the distributed representation learning section 11 multiplies the weight $W_{V \times N}$ by the input vector x to generate a word vector h of the hidden layer. Then, the distributed representation learning section 11 multiplies the weight $W'_{N \times V}$ by the word vector h to generate output vectors y of the output layer. For example, the distributed representation learning section 11 executes prediction using $W_{V \times N}$ in the initial state. As a result, the distributed representation learning section 11 predicts that a word preceding the given word is "drink" with a probability of 0.1230 and that a word succeeding the given word is "juice" with a probability of 0.1277.

Next, as illustrated in FIG. 3B, when the actually calculated output vectors y are different from predefined predicted vectors, the distributed representation learning section 11 updates the weights serving as parameters in the order of $W'_{N \times V}$ and $W_{V \times N}$ based on the differences between the output vectors y and the predefined predicted vectors. The update of the parameters is referred to as back propagation, for example. Then, the distributed representation learning section 11 multiplies the updated weight $W_{V \times N}$ by the input vector x to generate a word vector h of the hidden layer. Then, the distributed representation learning section 11 multiplies the updated weight $W'_{N \times V}$ by the word vector h to generate output vectors y of the output layer. For example, the distributed representation learning section 11 executes prediction using the updated $W'_{N \times V}$ and $W_{V \times N}$. As a result, the distributed representation learning section 11 predicts that the word preceding the given word is "drink" with a probability of 0.1236 and that the word succeeding the given word is "juice" with a probability of 0.1289. These probabilities are slightly higher than the previously predicted probabilities.

Next, as illustrated in FIG. 3C, the distributed representation learning section 11 uses an algorithm of the back propagation to repeatedly execute the aforementioned process (iteration) until the optimal output vectors are generated. The optical output vectors indicate that a probability with which words in the vicinity of the given word simultaneously appear is maximal. For example, the optical output vectors indicate that probabilities with which the words in the vicinity of the given word appear are simultaneously approximated to 0.1. For example, the distributed representation learning section 11 may repeatedly execute the process a predetermined number of times. The predetermined number of times is, for example, 500, but the maximal number of times may be calculated as the predetermined number of times in an experiment. As a result, the distributed representation learning section 11 produces the word vector h appearing in the hidden layer as the distributed representation of the given apple "apple".

The distributed representation learning section 11 may replace the given word to another given word and produce a distributed representation of the other given word.

Returning to FIG. 1, the word classifying section 12 classifies words included in the word space of the target language different from the reference language into words common to words included in the word space of the reference language and words not common to words included in the word space of the reference language. For example, the word classifying section 12 executes morphological analysis on the target language learning corpus 22 and outputs words indicated by results of the analysis. The word classifying section 12 uses the words indicated by the results of the analysis and the alignment dictionary 23 to produce correspondence relationships between the words in the target language and words in the reference language. For example, the word classifying section 12 classifies the words included in the target language into the words common to the words included in the word space of the reference language and the words not common to the words included in the word space of the reference language. The words that are included in the word space of the target language and common to the words included in the word space of the reference language have the same meanings as the words included in the word space of the reference languages. The words that are included in the word space of the target language and are not common to the words included in the word space of the reference language do not have the same meanings as the words included in the word space of the reference language. As an example, the word included in the word space of the target language and corresponding to "apple" has the same meaning as the word "apple" in the reference language and is common to the word included in the word space of the reference language. The word included in the word space of the target language and corresponding to "sword" does not have the same meaning as any of the words included in the word space of the reference language and is not common to any of the words included in the word space of the reference language.

The parameter adjusting section 13 replaces distributed representations of the words included in the word space of the target language and common to the words included in the word space of the reference language with distributed representations of the words included in the word space of the reference language and corresponding to the common words included in the word space of the target language, and adjusts a parameter for a technique for producing a distributed representation of a word. For example, the parameter adjusting section 13 receives the target language learning corpus 22, selects the words included in the target language learning corpus 22 and common to the words included in the word space of the reference language, and replaces the distributed representations of the selected words with the distributed representation of the words included in the word space of the reference language. For example, the parameter adjusting section 13 replaces the distributed representations in the hidden layer of the Skip-gram model with the distributed representations of the words included in the word space of the reference language. Then, the parameter adjusting section 13 adjusts the weight $W'_{N \times V}$ that is the parameter between the hidden layer and the output layer. The parameter adjusting section 13 sequentially selects all the common words and executes a process of adjusting the parameter on the selected words.

Figure 4:
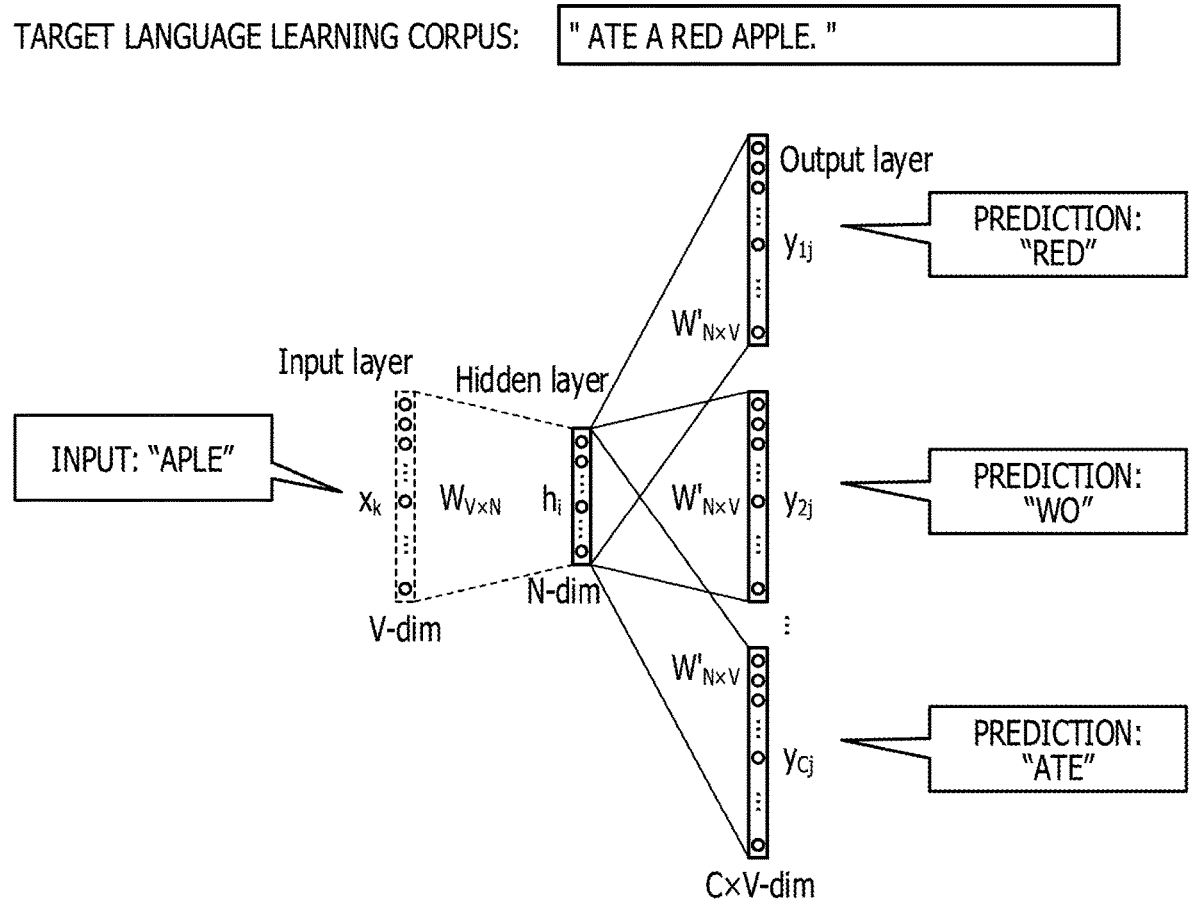
FIG. 4 is a diagram illustrating an example of a process of adjusting a parameter according to the embodiment.

The process of adjusting the parameter by the parameter adjusting section 13 is described with reference to FIG. 4. FIG. 4 is a diagram illustrating an example of the process of adjusting the parameter according to the embodiment. The example assumes that the reference language is English and that the target language is Japanese. The target language learning corpus 22 indicates " • • • ate a red apple • • • " in the target language. The example also assumes that a common word within the target language learning corpus 22 is a target language word corresponding to "apple". The case where the parameter is adjusted using the target language common word corresponding to "apple" is described with reference to FIG. 4.

As illustrated in FIG. 4, the parameter adjusting section 13 uses the target language word corresponding to "apple" and appearing in common between the reference language and the target language to adjust the weight $W'_{N \times V}$ that is the parameter between the hidden layer and the output layer.

For example, the parameter adjusting section 13 replaces the word vector $h_i$ of the hidden layer with a distributed representation of "apple". Then, the parameter adjusting section 13 fixes the hidden layer and adjusts the weight $W'_{N \times V}$ that is the parameter between the hidden layer and the output layer. For example, the parameter adjusting section 13 adjusts the weight $W'_{N \times V}$ using a value of the word vector $h_i$ of the hidden layer and values of output vectors $y_{1j}$ to $y_{cj}$ of the output layer.

i of $h_i$ is an index indicating an i-th element of the word vector of the hidden layer. k of $x_k$ is an index indicating a k-th element of a V-th dimensional one-hot vector corresponding to the input word. C of $y_{1j}$ to $y_{cj}$ is the number of predetermined panels or is the maximum number of words preceding and succeeding words the input word. j of $y_{1j}$ to $y_{cj}$ is an index indicating a j-th element of an output vector corresponding to a C-th word of the output layer.

When the actually calculated output vectors $y_{1j}$ to $y_{cj}$ are different from the predefined predicted vectors, the parameter adjusting section 13 updates, based on the differences between the output vectors $y_{13}$ to $y_{cj}$ and the predefined predicted vectors, the weight $W'_{N\times V}$ that is the parameter. The parameter is updated in the same manner as the update to be executed by the distributed representation learning section 11. The parameter may be updated using, for example, the back propagation.

Returning to FIG. 1, the adjusted parameter distributed representation learning section 14 uses the parameter adjusted by the parameter adjusting section 13 to learn a distributed representation of a word that is included in the word space of the target language and is not common to any word included in the word space of the reference language. For example, the adjusted parameter distributed representation learning section 14 receives the target language learning corpus 22. When a word that is included in the target language learning corpus 22 and is not common to any word included in the word space of the reference language exists, the adjusted parameter distributed representation learning section 14 executes the following process. The adjusted parameter distributed representation learning section 14 sets the weight $W'_{N\times V}$ that is the parameter adjusted by the parameter adjusting section 13. Then, the adjusted parameter distributed representation learning section 14 inputs a one-hot vector of the uncommon word to the input layer and learns a distributed representation of the uncommon word using the Skip-gram model of Word2Vec.

Figure 5:
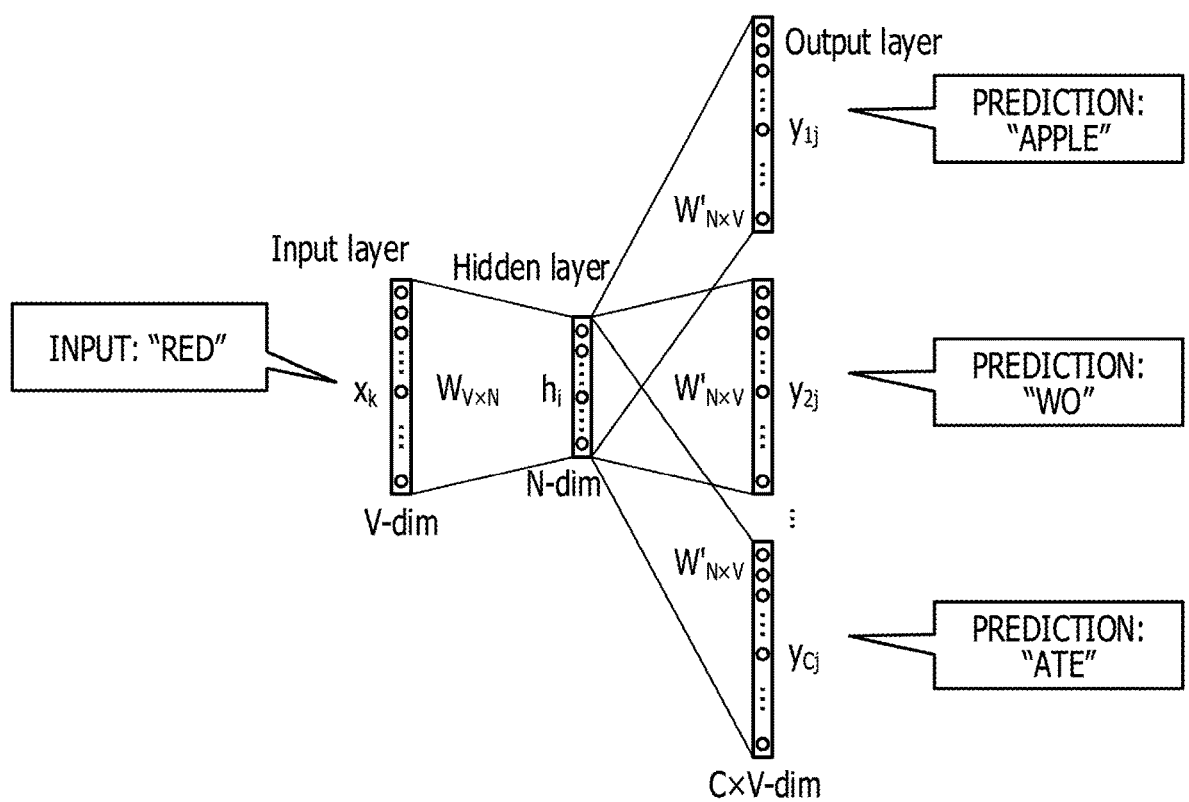
FIG. 5 is a diagram illustrating an example of a process of learning a distributed representation using the adjusted parameter according to the embodiment.

A process of learning a distributed representation using the adjusted parameter by the adjusted parameter distributed representation learning section 14 is described with reference to FIG. 5. FIG. 5 is a diagram illustrating an example of the process of learning a distributed representation using the adjusted parameter according to the embodiment. The example assumes that the reference language is English and that the target language is Japanese. The example also assumes that the target language learning corpus 22 indicates " • • • ate a red apple • • • " in the target language. The example also assumes that in the target language learning corpus 22, uncommon words are a target language word corresponding to the word "red", a target language particle "wo", and a target language word corresponding to the word "ate", and a common word is the target language word corresponding to the word "apple". The case where a distributed representation of the target language word corresponding to the word "red" is learned is described with reference to FIG. 5.

As illustrated in FIG. 5, the adjusted parameter distributed representation learning section 14 sets, in the Skip-gram model, the weight $W'_{N\times V}$ that is the parameter adjusted by the parameter adjusting section 13. After that, the adjusted parameter distributed representation learning section 14 learns distributed representations of the uncommon words. A method for learning the distributed representations is the same as or similar to the method described above together with the distributed representation learning section 11. For example, it is assumed that an input vector x is a one-hot vector indicating that an element corresponding to the uncommon input target language word corresponding to the word "red" is 1 and that other elements are 0. When the adjusted parameter distributed representation learning section 14 receives the input vector x corresponding to the input target language word corresponding to the word "red", the adjusted parameter distributed representation learning section 14 multiplies the weight $W_{V\times N}$ by the input vector x to generate a word vector h of the hidden layer. Then, the distributed representation learning section 11 multiplies the weight $W'_{N\times V}$ by the word vector h to generate output vectors y of the output layer. When the actually calculated output vectors y are different from predefined predicted vectors, the adjusted parameter distributed representation learning section 14 updates the parameters in the order of $W'_{N\times V}$ and $W_{V\times N}$ based on the differences between the calculated output vectors y and the predefined predicted vectors. Then, the adjusted parameter distributed representation learning section 14 adjusts the parameters by repeatedly learning the distributed representation of the input target language word corresponding to the word "red".

Returning to FIG. 1, the learning termination determining section 15 determines the termination of the learning.

For example, when the difference between the weight $W'_{N\times V}$ that is the parameter before the update of the weight $W'_{N\times V}$ and the weight $W'_{N\times V}$ that is the parameter after the update of the weight $W'_{N\times V}$ is smaller than a threshold, the learning termination determining section 15 terminates the learning. The weight $W'_{N\times V}$ before the update is a value upon the termination of the activation of the parameter adjusting section 13 or upon the start of the activation of the adjusted parameter distributed representation learning section 14. The weight $W'_{N\times V}$ after the update is a value upon the termination of the activation of the parameter distributed representation learning section 14. A requirement for the termination of the learning is expressed by the following Inequality (1). $W'_{N\times Vnew}$ is $W'_{N\times V}$ after the update of $W'_{N\times V}$. $W'_{N\times Vold}$ is $W'_{N\times V}$ before the update of $W'_{N\times V}$. ε is a threshold. It is sufficient if the difference between the weight $W'_{N\times V}$ before the update and the weight $W'_{N\times V}$ after the update is determined to be sufficiently small based on the threshold.

$$W'_{N\times Vnew} - W'_{N\times Vold} < \varepsilon \quad (1)$$

When the difference between the weight $W'_{N\times V}$ before the update and the weight $W'_{N\times V}$ after the update is equal to or larger than the threshold, the learning termination determining section 15 causes the parameter adjusting section 13 and the adjusted parameter distributed representation learning section 14 to repeatedly operate.

The case where the learning termination determining section 15 determines that the difference between the weight $W'_{N\times V}$ before the update and the weight $W'_{N\times V}$ after the update is smaller than the threshold as the requirement for the termination of the learning is described above, but the embodiment is not limited to this. The learning termination determining section 15 may terminate the learning when the predetermined process (iteration) is executed a predetermined number of times.

[Flowchart of Learning Process]

Figure 6:
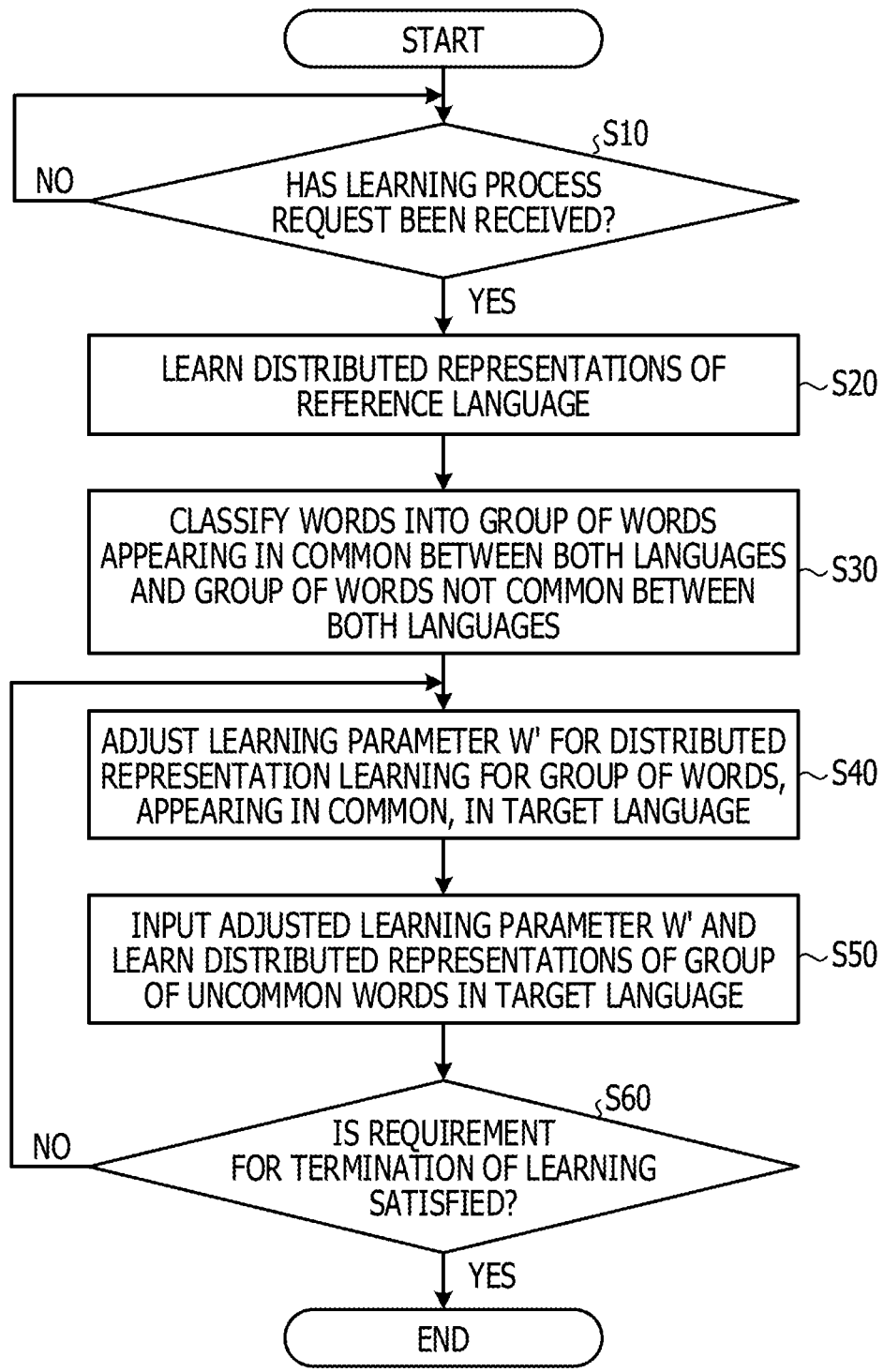
FIG. 6 is a diagram illustrating an example of a flowchart of a learning process according to the embodiment.

FIG. 6 is a diagram illustrating an example of a flowchart of a learning process according to the embodiment. The example assumes that a word space of a reference language with language resources of an amount larger than the defined amount and a word space of a target language with language resources of an amount smaller than the defined amount exist.

As illustrated in FIG. 6, the learning unit 10 determines whether or not the learning unit 10 has received a learning process request (in step S10). When the learning unit 10 determines that the learning unit 10 has not received the learning process request (No in step S10), the learning unit 10 repeats the determination process until the learning unit 10 receives the learning process request.

When the learning unit 10 determines that the learning unit 10 has received the learning process request (Yes in step S10), the learning unit 10 learns distributed representations of words in the reference language (in step S20). For example, the learning unit 10 uses the Skip-gram model of Word2Vec to learn the distributed representations of the words in the reference language.

Then, the word classifying section 12 classifies words into a group of words appearing in common between the reference language and the target language and a group of words uncommon between the reference language and the target language (in step S30). For example, the word classifying section 12 executes morphological analysis on the target language learning corpus 22 and outputs words indicated by results of the analysis. The word classifying section 12 uses the words indicated by the results of the analysis and the alignment dictionary 23 to produce correspondence relationships between words in the target language and words in the reference language. Then, the word classifying section 12 uses the correspondence relationships to classify the words included in the word space of the target language into a group of words common to words included in the word space of the reference language and a group of words not common to words included in the word space of the reference language.

Subsequently, the parameter adjusting section 13 adjusts a learning parameter W' for the distributed representation learning for the group of the words appearing in common and included in the word space of the target language (in step S40). For example, the parameter adjusting section 13 sequentially selects the words from among the group of the words appearing in common and replaces distributed representations of the selected words with distributed representations of the words in the reference language. For example, the parameter adjusting section 13 replaces the hidden layer of the Skip-gram model with the distributed representations of the words in the reference language. Then, the parameter adjusting section 13 adjusts the weight $W'_{N \times V}$ that is the parameter between the hidden layer and the output layer.

Subsequently, the adjusted parameter distributed representation learning section 14 inputs the adjusted learning parameter W' and learns distributed representations of the group of the words that are included in the word space of the target language and are not common to the words included in the word space of the reference language (in step S50). For example, the adjusted parameter distributed representation learning section 14 sets, in the Skip-gram model, the weight $W'_{N \times V}$ that is the parameter adjusted by the parameter adjusting section 13. The adjusted parameter distributed representation learning section 14 sequentially selects the words from among the group of the words that are included in the word space of the target language and are not common to the words included in the word space of the reference language, inputs one-hot vectors of the selected words to the input layer, and uses the Skip-gram model to learn the distributed representations of the selected words.

Then, the learning termination determining section 15 determines whether or not the requirement for the termination of the learning is satisfied (in step S60). For example, the learning termination determining section 15 determines whether or not the difference between the weight $W'_{N \times V}$ that is the parameter before the update of the weight $W'_{N \times V}$ and the weight $W'_{N \times V}$ that is the parameter after the update of the weight $W'_{N \times V}$ is smaller than the threshold. The weight $W'_{N \times V}$ before the update is the parameter adjusted by the parameter adjusting section 13. The weight $W'_{N \times V}$ after the update is the parameter adjusted by the adjusted parameter distributed representation learning section 14. When the learning termination determining section 15 determines that the requirement for the termination of the learning is not satisfied (No in step S60), the learning termination determining section 15 causes the learning process to proceed to step S40 in order to further adjust the weight $W'_{N \times V}$ after the update.

When the learning termination determining section 15 determines that the requirement for the termination of the learning is satisfied (Yes in step S60), the learning termination determining section 15 terminates the learning process.

In the learning process according to the embodiment, the meanings of words may be interpreted and documents and similarity relationships between sentences may be searched for with high accuracy by producing distributed representations of the words. By applying the learning process according to the embodiment to a question and answer (Q/A) site, an appropriate answer may be searched for from a large number of past questions with high accuracy. Especially, many Q/A sites related to computers are English sites and tend to be made in many languages including Japanese. As the amount of questions and answers is larger, learning using machine learning is more desirable. To use the machine learning, language resources with a large amount are to be used. Since the amount of language resources of Japanese is smaller than the amount of language resources of English, English information may be effectively used by using the learning process according to the embodiment.

Effects of Embodiment

According to the embodiment, the information processing device 1 uses the learner for learning distributed representations to learn distributed representations of words included in a word space of a first language. The information processing device 1 classifies words included in a word space of a second language different from the first language into words common to words included in the word space of the first language and words not common to words included in the word space of the first language. The information processing device 1 replaces distributed representations of the common words included in the word space of the second language with distributed representations of the words, corresponding to the common words, in the first language and adjusts the parameter of the learner. According to this configuration, the information processing device 1 may use distributed representations of language resources of the first language to produce distributed representations of language resources of the second language with high accuracy in the learning of the distributed representations of the language resources of the second language. For example, even when the amount of language resources of the second language is not sufficient, the information processing device 1 may use distributed representations of a sufficient amount of language resources of the first language to produce distributed representations with high accuracy.

According to the embodiment, the information processing device 1 inputs the adjusted parameter to the learner and uses the learner to learn distributed representations of the uncommon words included in the word space of the second language. According to this configuration, the information processing device 1 may learn a distributed representation of a word that is included in the word space of the second language and is not included in the word space of the first language.

According to the embodiment, the information processing device 1 outputs the distributed representations of the common words and the distributed representations of the uncommon words as a result of the learning. According to this configuration, the information processing device 1 may interpret the meanings of the words included in the word space of the second language and search for documents and similarity relationships between sentences with high accuracy.

According to the embodiment, in the information processing device 1, the word space of the first language includes language resources of an amount larger than the defined amount, and the word space of the second language includes language resources of an amount smaller than the defined amount. According to this configuration, even when the amount of language resources included in a word space is not sufficient, the information processing device 1 may learn distributed representations with high accuracy.

[Others]

The constituent elements of the device illustrated may not be physically configured as illustrated in FIG. 1. Specific forms of the distribution and integration of the device are not limited to those illustrated in FIG. 1, and some or all of the constituent elements may be functionally or physically distributed or integrated in arbitrary units, depending on various loads, usage states, and the like. For example, the parameter adjusting section 13 and the adjusted parameter distributed representation learning section 14 may be integrated with each other. The storage unit 20 may be installed outside the information processing device 1 and connected to the information processing device 1 via a network.

Figure 7:
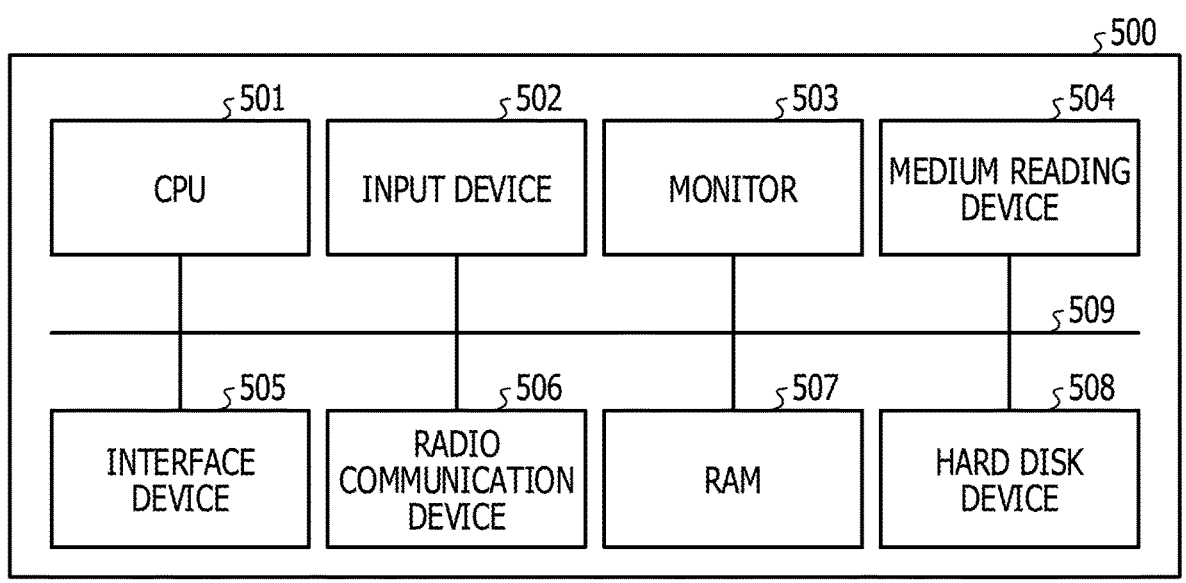
FIG. 7 is a diagram illustrating an example of a hardware configuration of the information processing device.
Figure 8:
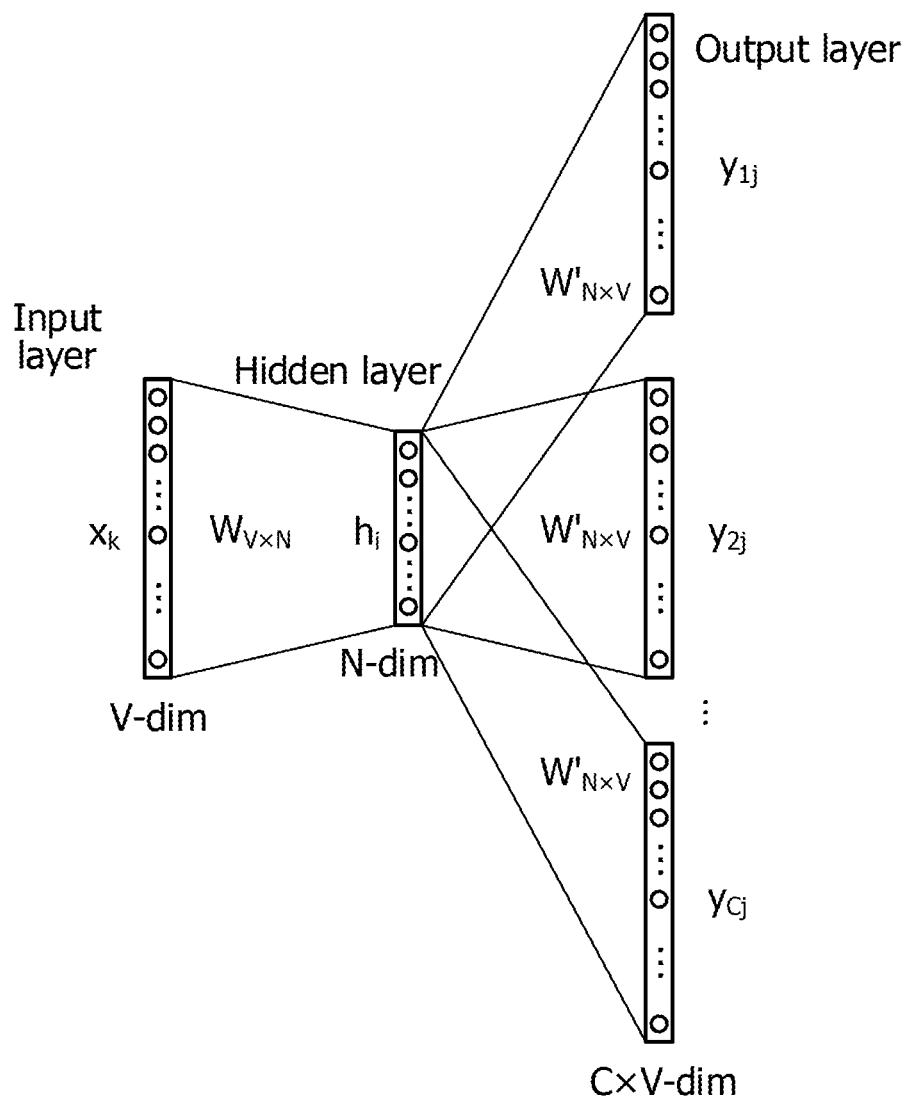
FIG. 8 is a diagram illustrating the Skip-gram model of Word2Vec.
Figure 9:
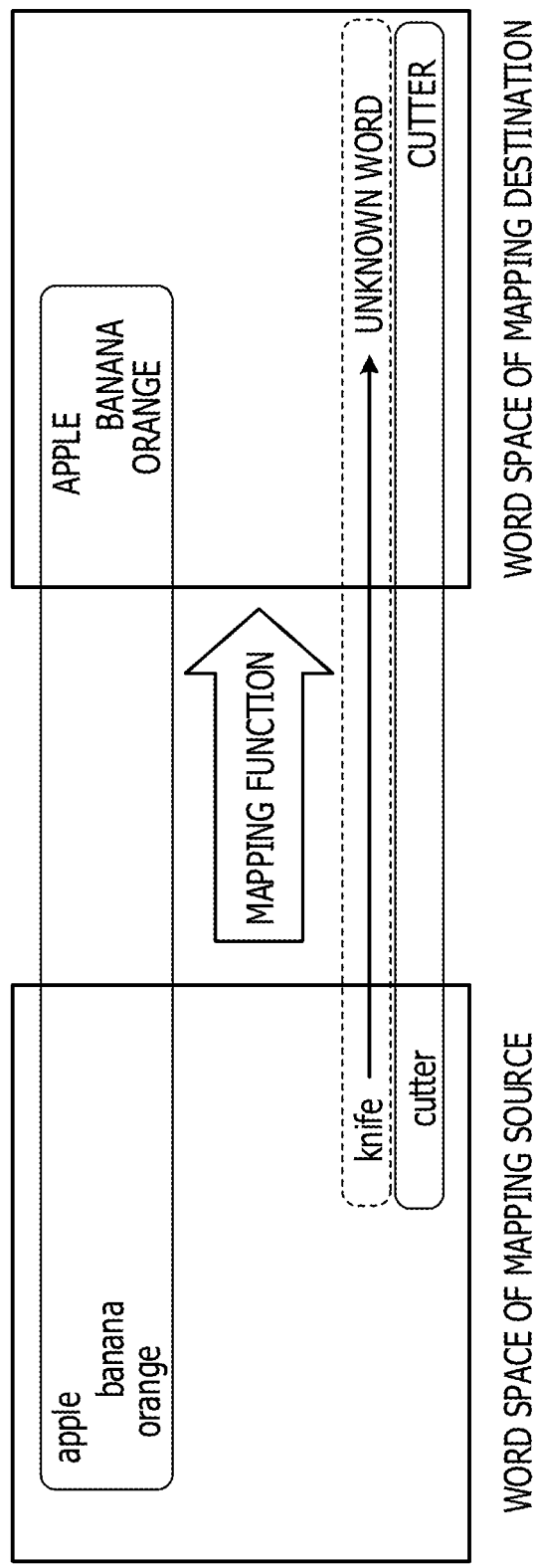
FIG. 9 is a diagram illustrating an example of vector mapping to be executed between tasks using distributed representations of words.

FIG. 7 is a diagram illustrating an example of a hardware configuration of the information processing device. As illustrated in FIG. 7, a computer 500 includes a CPU 501 for executing various types of arithmetic processing, an input device 502 for receiving input data from a user, and a monitor 503. The computer 500 also includes a medium reading device 504 for reading a program and the like from a storage medium, an interface device 505 for connecting the computer 500 to another device, and a radio communication device 506 for wirelessly connecting the computer 500 to another device. The computer 500 also includes a random access memory (RAM) 507 for temporarily storing various types of information and a hard disk device 508. The devices 501 to 508 are connected to a bus 509.

In the hard disk device 508, a learning program that includes the same functions as those of the learning unit 10 illustrated in FIG. 1 is stored. In the hard disk device 508, various types of data to be used to enable the learning program are stored. The various types of data include data stored in the storage unit 20 illustrated in FIG. 1.

The CPU 501 reads the learning program stored in the hard disk device 508, loads the read program into the RAM 507, and executes the loaded learning program to execute the various processes. The learning program enables the computer 500 to function as the functional sections illustrated in FIG. 1.

The learning program may not be stored in the hard disk device 508. For example, the computer 500 may read the learning program stored in a storage medium readable by the computer 500 and execute the read learning program. The storage medium readable by the computer 500 corresponds to a portable storage medium such as a CD-ROM, a DVD, or a Universal Serial Bus (USB) memory, a semiconductor memory such as a flash memory, a hard disk drive, or the like. Alternatively, the learning program may be stored in a device connected to a public line, the Internet, a local area network (LAN), or the like, and the computer 500 may read the learning program from the device via the public line, the Internet, the LAN, or the like and execute the read learning program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   causing a learner to learn distributed representations of words included in a word space of a first language;
   classifying words included in a word space of a second language different from the first language into common words common to words included in the word space of the first language and uncommon words not common to words included in the word space of the first language, language resources of the word space of the first language being larger than the language resources of the word space of the second language;
   replacing distributed representations of the common words included in the word space of the second language with distributed representations of the words included in the word space of the first language corresponding to the common words;
   adjusting a weight for obtaining an output result based on the replaced distributed representations to be used in the learner;
   inputting the adjusted weight to the learner; and
   causing the learner to learn distributed representations of the uncommon words among the words included in the word space of the second language.

2. The storage medium according to claim 1, the process further comprising:
   outputting the distributed representations of the common words and the distributed representations of the uncommon words as a result of the learning.

3. The storage medium according to claim 1, wherein the learner learns the distributed representations of the words included in the word space of the first language and the distributed representations of the uncommon words included in the word space of the second language using Skip-gram model of Word2Vec.

4. The storage medium according to claim 3, wherein the replacing includes
   replacing a hidden layer of the Skip-gram model with the distributed representations of the words included in the word space of the first language corresponding to the common words.

5. The storage medium according to claim 4, wherein the adjusting includes adjusting the weight that is a parameter between the hidden layer and an output layer of the Skip-gram model.

6. The storage medium according to claim 1, wherein the classifying includes:
   executing morphological analysis on a corpus for learning the second language,
   outputting words indicated by results of the morphological analysis,
   using the words indicated by the results of the morphological analysis and an alignment dictionary to acquire correspondence relationships between words in the second language and words in the first language, and classifying the words included in the word space of the second language based on the acquired correspondence relationships.

7. An information processing device comprising:
a memory; and
a processor coupled to the memory and configured to:
  cause a learner to learn distributed representations of words included in a word space of a first language;
  classify words included in a word space of a second language different from the first language into common words common to words included in the word space of the first language and uncommon words not common to words included in the word space of the first language, language resources of the word space of the first language being larger than the language resources of the word space of the second language;
  replace distributed representations of the common words included in the word space of the second language with distributed representations of the words included in the word space of the first language corresponding to the common words;
  adjust a weight for obtaining an output result based on the replaced distributed representations to be used in the learner
  input the adjusted weight to the learner; and
  cause the learner to learn distributed representations of the uncommon words among the words included in the word space of the second language.

8. The information processing device according to claim 7, wherein the processor is configured to:
  output the distributed representations of the common words and the distributed representations of the uncommon words as a result of learning the distributed representations of the uncommon words.

9. The information processing device according to claim 7,
  wherein the learner learns the distributed representations of the words included in the word space of the first language and the distributed representations of the uncommon words included in the word space of the second language using Skip-gram model of Word2Vec.

10. A learning method to be executed by a computer, the learning method comprising:
  causing a learner to learn distributed representations of words included in a word space of a first language;
  classifying words included in a word space of a second language different from the first language into common words common to words included in the word space of the first language and uncommon words not common to words included in the word space of the first language, language resources of the word space of the first language being larger than the language resources of the word space of the second language;
  replacing distributed representations of the common words included in the word space of the second language with distributed representations of the words included in the word space of the first language corresponding to the common words;
  adjusting a weight for obtaining an output result based on the replaced distributed representations to be used in the learner;
  inputting the adjusted weight to the learner; and
  causing the learner to learn distributed representations of the uncommon words among the words included in the word space of the second language.

* * * * *